(12) United States Patent
Tojo Soler et al.

(10) Patent No.: US 12,550,806 B2
(45) Date of Patent: Feb. 17, 2026

(54) ADVANCED CROP MANAGER FOR CROPS STRESS MITIGATION

(71) Applicant: FARMERS EDGE INC., Winnipeg (CA)

(72) Inventors: Cecilia M. Tojo Soler, Winnipeg (CA); Summer Xia, Winnipeg (CA); Eduardo Gelcer, Winnipeg (CA)

(73) Assignee: Farmers Edge Inc., Winnipeg (CA)

( * ) Notice: Subject to any disclaimer, the term of this patent is extended or adjusted under 35 U.S.C. 154(b) by 676 days.

(21) Appl. No.: 17/515,966

(22) Filed: Nov. 1, 2021

(65) Prior Publication Data

US 2022/0132724 A1    May 5, 2022

Related U.S. Application Data

(60) Provisional application No. 63/110,077, filed on Nov. 5, 2020.

(51) Int. Cl.
*A01B 79/00* (2006.01)
*G01W 1/02* (2006.01)
(Continued)

(52) U.S. Cl.
CPC .............. *A01B 79/005* (2013.01); *G01W 1/02* (2013.01); *G01W 1/14* (2013.01); *G06T 7/0016* (2013.01);
(Continued)

(58) Field of Classification Search
CPC ........ A01B 79/005; G01W 1/02; G01W 1/14; G06T 2207/10032; G06T 2207/30188;
(Continued)

(56) References Cited

U.S. PATENT DOCUMENTS

| | | | |
|---|---|---|---|
| 2008/0097653 A1* | 4/2008 | Kaprielian | A01C 23/042 47/79 |
| 2012/0101784 A1* | 4/2012 | Lindores | A01B 79/005 703/2 |

(Continued)

FOREIGN PATENT DOCUMENTS

| | | |
|---|---|---|
| AU | 2021101996 | 6/2021 |
| CN | 109492619 | 3/2019 |
| CN | 112931150 | 6/2021 |

OTHER PUBLICATIONS

Victor Banerjee, P. Krishnan, Bappa Das, A.P.S. Verma, E. Varghese, "Crop Status Index as an indicator of wheat crop growth condition under abiotic stress situations," Field Crops Research, vol. 181, Sep. 2015, pp. 16-31 (Year: 2015).*

(Continued)

*Primary Examiner* — Jeffrey P Aiello
(74) *Attorney, Agent, or Firm* — Ryan W. Dupuis; Kyle R. Satterthwaite; Ade & Company Inc.

(57) ABSTRACT

A method of managing crop stress related to a crop growing within an agricultural field uses a cropping systems model executed on the computing device to simulate growth of the crop. At least one stress index representative of a crop stress affecting growth of the crop is calculated based upon acquired field centric data and one or more of stress thresholds associated with a determined growth stage of the crop to determine if a notification should be generated. This provides a tool to detect and quantify crops abiotic and biotic stresses at zone and field levels in actual time during the growing season using crop specific parameters, field data and remotely-sensed data, aiming to provide growers with useful information to mitigate crops stresses and increase yield.

25 Claims, 12 Drawing Sheets

(51) Int. Cl.
  *G01W 1/14* (2006.01)
  *G06T 7/00* (2017.01)
  *G06V 20/10* (2022.01)
(52) U.S. Cl.
  CPC .. *G06V 20/188* (2022.01); *G06T 2207/30188* (2013.01)
(58) Field of Classification Search
  CPC .. G06T 7/0016; G06V 20/188; G06V 20/194; G06V 20/17; G06V 10/82; G06V 10/7784; G06V 10/143; G06N 20/00; G06N 3/006; G06N 3/088; G06N 3/02; G06F 18/21; G06F 18/2178; A01G 7/00; A01G 22/00; A01G 2/00; A01G 17/005; A01G 25/16; G01N 33/0098; G01N 33/025; G01N 33/24; G01N 33/246; G01N 2033/245
  USPC ........ 382/110, 191; 700/108, 283, 275, 240; 702/2, 188, 5, 189, 3, 19, 1, 127, 81, 85, 702/182, 22, 136; 703/11, 12
  See application file for complete search history.

(56) References Cited

U.S. PATENT DOCUMENTS

2018/0012168 A1* 1/2018 Hunt ................ G06Q 10/06375
2020/0329650 A1* 10/2020 Xu ......................... H04L 43/045
2020/0359550 A1* 11/2020 Tran ....................... G06V 10/82

OTHER PUBLICATIONS

Suzuki, N., Rivero, R.M., Shulaev, V., Blumwald, E. and Mittler, R., "Abiotic and biotic stress combinations," New Phytologist, vol. 203, Feb. 2014, pp. 32-43 (Year: 2014).*

* cited by examiner

126

127

ADVANCED CROP MANAGER FOR CROPS STRESS MITIGATION

FIELD OF THE INVENTION

The present invention relates to a tool to detect and quantify crops abiotic and biotic stresses at zone and field levels at different times, ex-ante, actual time during the growing season, and ex-post, using crop specific parameters, field centric and remotely-sensed data, aiming to provide growers with unique and useful information to manage their crops to mitigate stresses and increase crops yield.

BACKGROUND

Advances in the Internet of Things (IoT), ubiquitous connectivity, cheap storage, and cloud-computing power are making more data accessible for analysis. Precision agriculture is just one of the technical fields that is experiencing the advantages of these connectivity advances and access to cloud-based solutions. Benefits range from descriptive and prescriptive analytics, real-time alerting of field events (e.g., crop stages, equipment behavior, etc.), and optimization of operational processes, resulting in better practices that reduce input costs and maximize profit.

Precision agriculture techniques can assist growers to increase crops' production by addressing the major environmental stresses that occur during the growing season. For instance, drought stress is a major problem in rainfed production systems due to its impact on yield and quality of the harvested products. In addition, heat stress can occur at the same time of drought stress. The impact on yield due to both stresses combined can be synergistic. High night temperatures during the season result in increased crops respiration, negatively impacting the final yield. Other known stress is low solar radiation, especially when it occurs in key reproductive growth stages of some crops, that can result in fallen flowers and other reproductive structures, and consequently result in reduced yield and low quality of the harvested products. Frost can also cause damaged crops, depending on the severity and growth stages at which it occurs, it can result in important yield reductions. Excess water stress can occur during periods of excessive rains, producing hypoxic conditions in the soil, especially in low areas of the fields, which in turns affect crops nutrients uptake, reducing biomass production and yield of most crops.

Biotic stresses caused by diseases and insects usually cause a reduction of leaf area, decreasing the effective green leaf area for photosynthesis and biomass accumulation, resulting in an adverse impact on final yield. If those stresses occur during critical growth stages the impact on yield can be magnified due to a reduction of biomass partitioned to fruits or grains, and/or meristems damage. By knowing in advance the risk of pests and diseases for each field and particular zones in each field, growers can take proactive measures in planning pest monitoring and management strategies, such as applying insecticides or fungicides based on field observed disease pressure and weather forecast and forecasted disease pressure, or based on insect feeding pressure and predicted insect life stages. The biotic stress forecasting will help growers make more informed decisions in pest management, such as applying a product when and where it is needed. It also helps reduce the costs, and the potential negative effects of these products on the environment.

Remotely-sensed image data and products derived from that data (i.e., imagery products) are being increasingly utilized in agriculture. These data products can provide rapid, and synoptic estimates of crop conditions over acres of agricultural fields. For example, an imagery product may estimate the crop conditions for a particular field using a combination of features and vegetation indices derived from the observed image's spectral data. By way of illustration, an imagery product may derive a Normalized Difference Vegetation Index (NDVI) from spectral data. Crops health change throughout the season can be identified using remotely-sensed maps. The identification of areas of the fields with negative health change allows growers to implement variable rates of agrochemical applications. For some crops, such as cotton, the environmental variables negatively affecting yield usually affect cotton fiber quality. Since cotton growers are paid by the amount and quality of the cotton produced, knowing, and acting to reduce the negative impact of stresses on cotton production is crucial.

SUMMARY OF THE INVENTION

According to one aspect of the present invention there is provided a method of managing crop stress related to a crop growing within an agricultural field during a growing season using a computing device, the method comprising:
  providing a plurality of different stress thresholds stored on the computing device in association with different prescribed growth stages of the crop;
  acquiring field centric data defining parameters associated with the crop growing within the agricultural field during the growing season;
  determining the growth stage of the crop using the acquired field centric data input into a cropping systems model executed on the computing device to simulate growth of the crop;
  calculating at least one stress index representative of a crop stress affecting growth of the crop based upon the acquired field centric data and one or more of the stress thresholds associated with the determined growth stage of the crop;
  determining a notification condition based upon the at least one stress index calculated and generating a notification in response to determination of the notification condition.

This invention provides a tool to detect and quantify crops abiotic and biotic stresses at zone and field levels in actual time during the growing season using crop specific parameters, field data and remotely-sensed data, aiming to provide growers with useful information to mitigate crops stresses and increase yield. Different stresses indices are aggregated to better characterize the daily environment for crops growth and development, and to provide growers with crucial information to mitigate the biotic and abiotic stresses. The detection and quantification of the stresses takes in account the different growth stages of the crop, including algorithms with different thresholds for the different environmental variables, it also accounts for the severity of the stresses as the algorithms account for the negative impact of consecutive days with stress on crops. The different stresses indices are interpreted, and associated summaries before the season (ex-ante analysis), during the season, and after the season (ex-post analysis) are provided to growers or authorized third parties.

Preferably said at least one stress index comprises a plurality of stress indices, each stress index being calculated using measured data among the acquired field centric data, in which the measured data used to calculate each stress index define different parameters than other stress indices.

The at least one stress index may include (i) at least one abiotic stress index representative of an abiotic stress acting upon the crop growing within the agricultural field during the growing season and (ii) at least one biotic stress index representative of a biotic stress acting upon the crop growing within the agricultural field during the growing season.

When the at least one stress index comprises a plurality of stress indices, the method preferably further comprises calculating at least one aggregate index by integrating two or more of the stress indices.

Preferably each stress index is standardized to a value between zero and one.

When the at least one stress index includes a weighted stress index having weighting criteria associated therewith, the method may further include correcting the weighted stress index by a weighting factor if the weighting criteria is met for a prescribed number of consecutive days.

The notification condition may be determined by comparing the at least one stress index calculated to respective notification criteria.

The method may further include: (i) receiving remotely-sensed images of the agricultural field acquired during the growing season including at least one recent image that was recently acquired and at least one past image that was acquired previously to said at least one recent image; (ii) calculating a vegetation index for each of the remotely sensed images of the agricultural field; (iii) comparing the vegetation index of said at least one recent image and said at least one past image to identify negative health change areas representing portions of the agricultural field experiencing slower growth compared to a remainder of the agricultural field; and (iv) generating said notification upon identification of negative health change areas. The notification may include identification of the negative health change areas and identification of any calculated stress indices associated with the negative health change areas.

The field centric data input into the cropping systems model may comprise: (a) genotype characteristics; (b) soil profile properties obtained from soil samples; (c) weather data; and/or (d) crop management activities performed on the agricultural field.

Each stress index preferably includes a plurality of different stress thresholds associated therewith in which the different stress thresholds of the stress index are associated with different prescribed growth stages of the crop.

The method may further comprise: (i) prior to the growing season, simulating growth stages of the crop using historical data representing field centric data from past growing seasons; (ii) using crop phenology data and the simulated growth stages to calculate a probability associated with at least one stress index representative of a crop stress affecting growth of the crop; and (iii) storing the calculated probability for subsequent display to a user.

The method may further comprise: (i) subsequent to the growing season, simulating growth stages of the crop using the field centric data acquired throughout the growing season to calculate a potential yield representative of crop yield in the absence of crop stresses; (ii) calculating a plurality of abiotic stress indices based on the field centric data acquired throughout the growing season; (iii) applying the calculated abiotic stress indices to the potential yield to determine an attainable yield representative of crop yield resulting from abiotic crop stresses and in the absence of biotic crop stresses; and (iv) storing the calculated attainable yield for subsequent display to a user.

A climate efficiency may be further calculated by comparing the attainable yield to the potential yield, followed by storing the calculated climate efficiency for subsequent display to a user.

The method may also include (i) determining an actual yield subsequent to the growing season, (ii) calculating a management efficiency by comparing the attainable yield to the actual yield, and (iii) storing the calculated management efficiency for subsequent display to a user.

A yield gap indicative of crop yields lost to abiotic and biotic crop stresses combined may be calculated by subtracting actual yield from the potential yield, in which the calculated yield gap is stored for subsequent display to a user.

The at least one stress index may include at least one biotic stress index representative of a biotic stress acting upon the crop growing within the agricultural field during the growing season. In this instance, the method may further include determining a biotic stress risk by comparing the calculated biotic stress index to a stored historical biotic stress index having a growth stage in a prior growing season corresponding to the determined growth stage of the crop growing during the current growing season.

The method may further comprise using the cropping systems model to (i) simulate progression of a biotic stress acting upon the crop based upon the field centric data including weather data and crop management activities performed on the agricultural field and (ii) determine one or more predicted progression stages of the biotic stress; in which a notification is subsequently generated to apply a biotic stress treatment to the crop in response to determination of one of the progression stages of the biotic stress.

The at least one stress index may include a drought stress index, in which the drought stress index is calculated using an estimate of soil water content at a soil depth corresponding to an estimated root depth based upon the determined growth stage from the cropping systems model.

The at least one stress index may include a day heat stress index, in which the day heat stress index is calculated when a maximum measured daytime temperature exceeds a lower temperature threshold. Preferably the lower temperature threshold is dependent upon the determined growth stage of the crop.

The at least one stress index may include a night heat stress index, in which the night heat stress index may be calculated when a minimum measured nighttime temperature exceeds a lower temperature threshold. Preferably the lower temperature threshold is dependent upon the determined growth stage of the crop.

The at least one stress index may include an aggregate day heat and drought stress index calculated by integrating a day heat stress index and a drought stress index, in which the day heat stress index is calculated when a maximum measured daytime temperature exceeds a low temperature threshold. Preferably the low temperature threshold is dependent upon the determined growth stage of the crop, and the drought stress index is calculated using an estimate of soil water content at a soil depth corresponding to an estimated root depth based upon the determined growth stage from the cropping systems model.

The at least one stress index may include a low solar radiation stress index calculated from a determined number of cloudy days within a prescribed growth stage of the crop.

The at least one stress index may include an excess water stress index, in which the excess water stress index is calculated using (i) an estimate of soil water content at a soil depth corresponding to an estimated root depth based upon the determined growth stage from the cropping systems model and (ii) saturated water content.

The at least one stress index may include a frost index, in which the frost index is calculated based upon (i) a duration of a prescribed frost period in which observed temperature is below a lower temperature threshold and (ii) a minimum temperature observed.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1A:
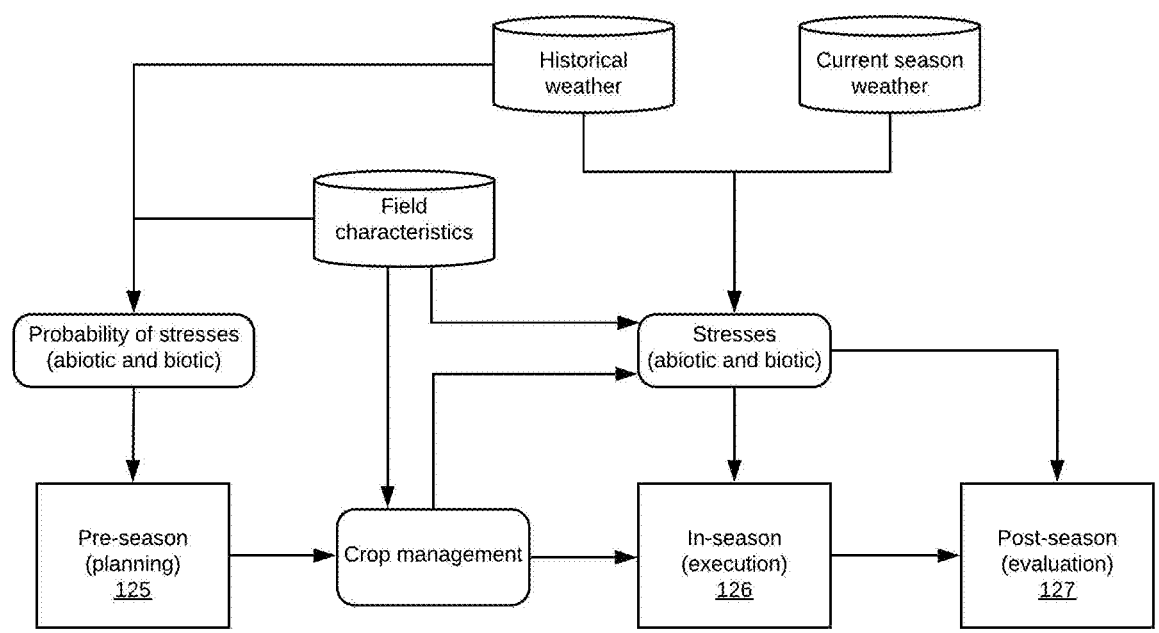
FIG. 1(a) illustrates a generalized overview of the stress mitigation tools of the advanced crop manager.

An overview of the advanced crop manager for crops stress mitigation tool is illustrated in FIG. 1(a). The tool will provide growers crucial information to mitigate biotic and abiotic stresses during three periods of time, a) preseason (ex-ante analysis) with the objective of operations planning such as planting date and varieties to use in the different fields, b) during the season (actual time analysis) to adjust management practices to mitigate stresses in actual time aiming to improve yield and quality of the harvested product, and c) postseason (ex-post analysis) evaluation to identify the main constrains that affected the crop during the growing season and to determine the effects of the management decisions and climatic conditions in the crop growth and development.

Figure 3:
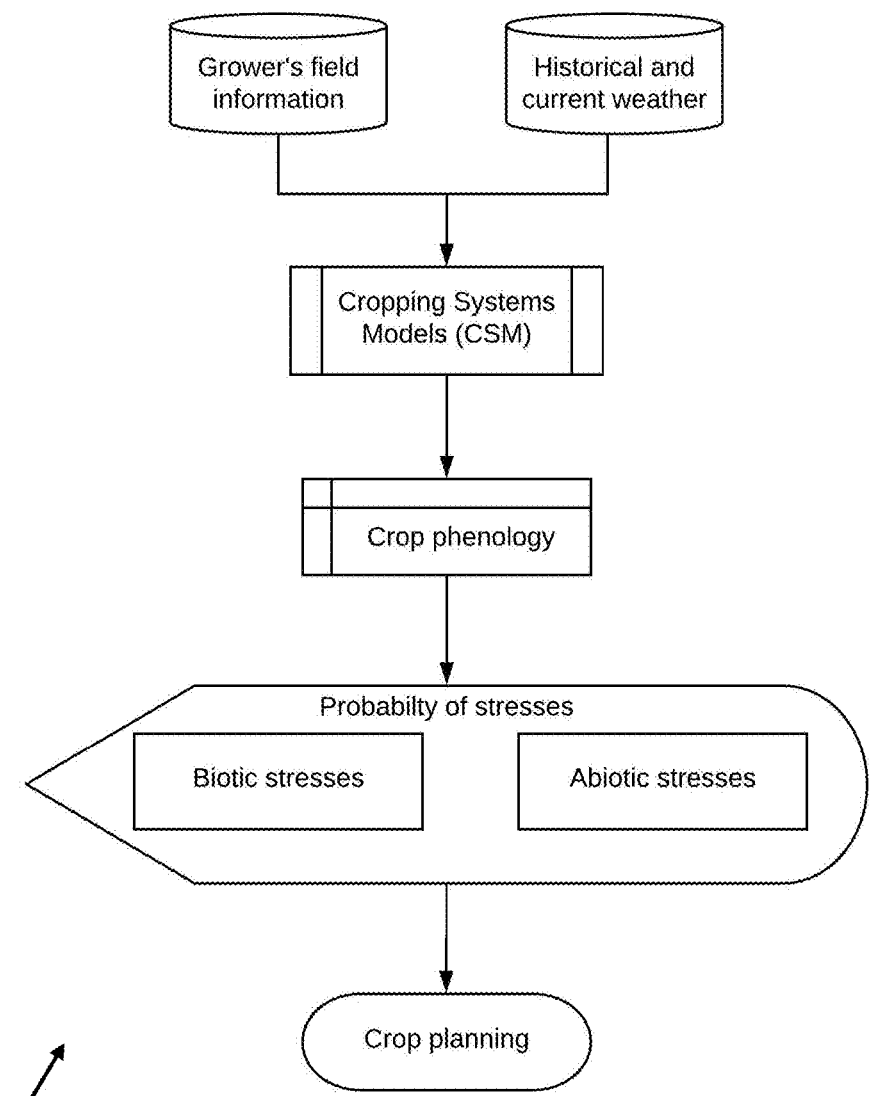
FIG. 3 illustrates an overview of the preseason crop stress module of the advanced crop manager.
Figure 4:
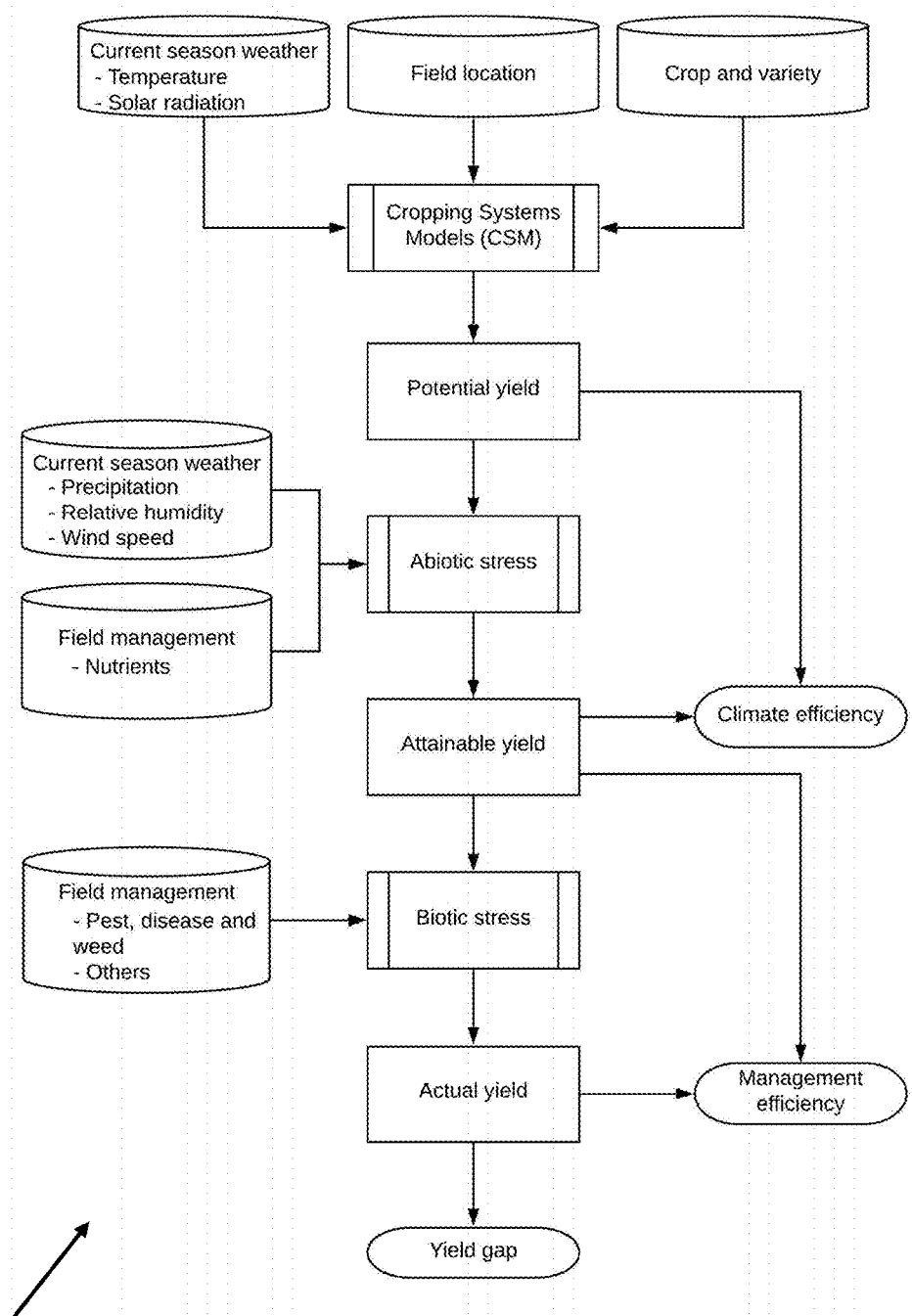
FIG. 4 illustrates an overview of the postseason crop stress module of the advanced crop manager.

The overview of the main stresses' components of the advanced crop manager are represented in a drawing (FIG. 2), as well as the overview of the preseason abiotic stresses' components (FIG. 3) and the postseason stresses (FIG. 4).

Figure 1B:
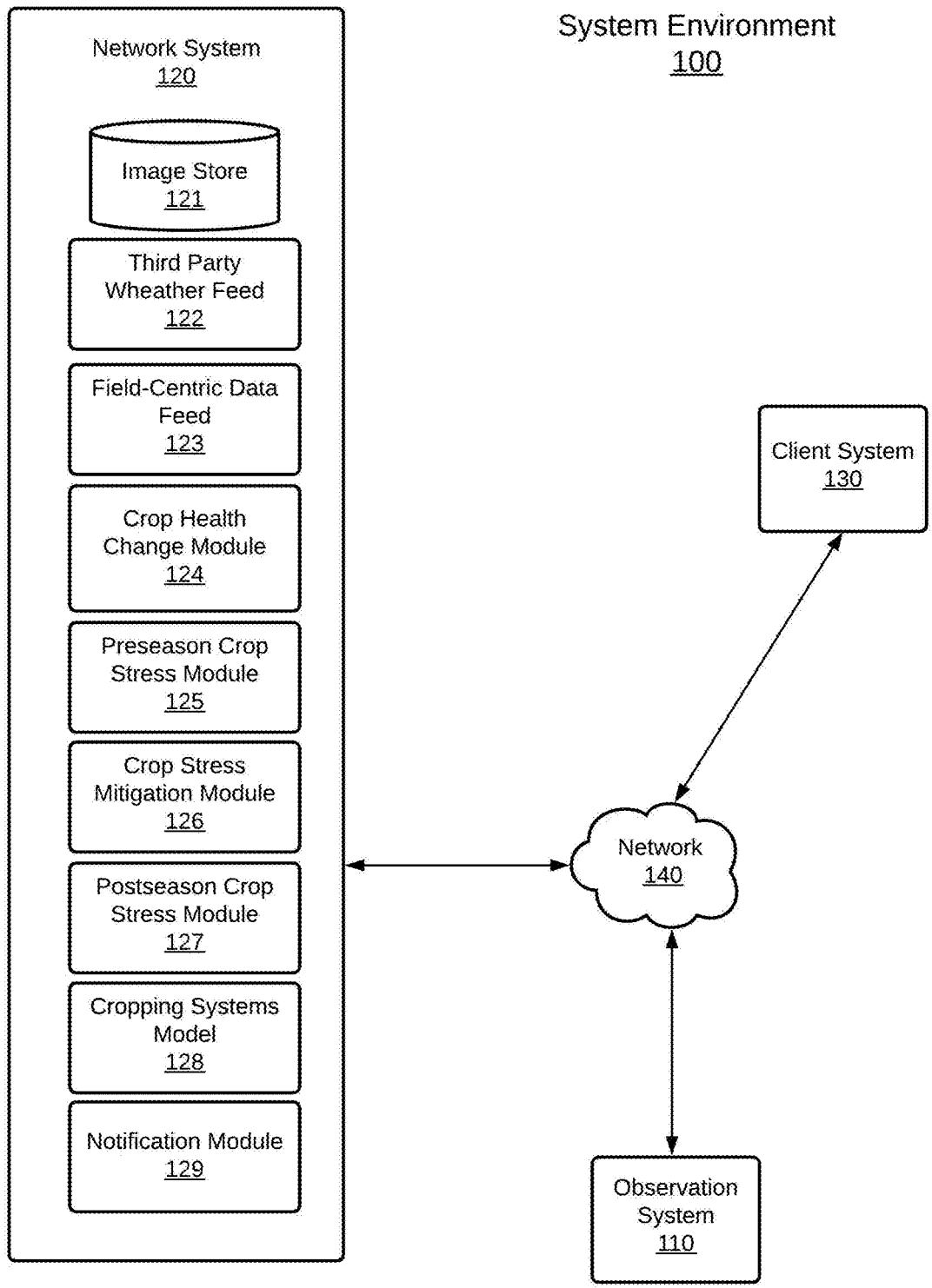
FIG. 1(b) is a block diagram illustrating components of an example computer system for reading and executing instructions from a machine-readable medium, according to one example embodiment of the advanced crop manager.

FIG. 1(b) illustrates the system environment of a farm management platform for the management of crop stresses, according to one example embodiment. Within the system environment 100 is an observation system 110, network system 120, client system 130, and a network 140 which links the different systems together. The network system 120 includes image store 121, third party weather feed 122, field-centric data feed (genotype, soil characteristics, weather, etc.) 123, crop health change module 124, preseason crop stress module 125, crop stress mitigation module 126, postseason mitigation module 127, Cropping Systems Model (CSM) 128, and notification module 129.

Other examples of a system environment are possible. For example, in various embodiments, the system environment 100 may include additional or fewer systems. To illustrate, a single client system may be responsible for multiple agricultural fields or management zones. The network system may leverage observations from multiple observation systems 110 for digitization of crop insurance services for each of the agricultural fields.

An observation system 110 is a system which provides remotely-sensed data of an agricultural field. In an embodiment, the remotely-sensed data is an observed image. Herein, an observed image is an image or photograph of an agricultural field taken from a remote sensing platform (e.g., an airplane, satellite, or drone). The observed image is a raster dataset composed of pixels with each pixel having a pixel value. Pixel values in an observed image may represent some ground characteristic such as, for example, a plant, a field, or a structure. The characteristics and/or objects represented by the pixels may be indicative of crop damage within an agricultural field in the image.

The observation system 110 may provide images of an agricultural field over a network 140 to the network system 120, wherein said images may be stored in the image store 121. Additionally, or alternatively, imagery derivatives generated by the crop health change module 124 may also be stored in the image store 121. In one embodiment, high resolution satellite imagery from multiple imagery sources provides 3 meter, 5 meter, and submeter resolution images to image store 121. With an ever-growing number of available imaging platforms, it is increasingly possible to obtain very high-frequency imagery of agricultural fields. Commercial satellite platforms are now capable of offering sub-daily revisit frequencies.

The third party weather feed 122 inputs information on weather, e.g., minimum and maximum daily temperatures and/or precipitation amounts, to the network system 120. The information may be accessed directly from the third party via the network 140. Weather information may be utilized by the Cropping Systems Model 128 to simulate crop growth to determine crop growth stages, or as inputs to the crop stress mitigation module 126, the preseason crop stress module 125, or the postseason crop stress module 127.

The field-centric data feed 123 receives information from field-centric data sources including soil analysis sensed locally or by laboratory analysis indicating soil nutrients and composition, weather stations which may provide current weather information or predictive modelling, forecasting, and detection of weather events, for example, wind speed, precipitation, solar radiation, maximum and minimum air temperatures during the day and at night, photoperiod, daily water balance, daily nitrogen balance, relative humidity, etc.

The crop health change module 124 draws images from the imaging store 121 to derive images used to create crop health change alerts for an agricultural field. If certain criteria are met, the crop health change module 124 will generate a notification to be transmitted to the client system 110 via a network 140. Negative changes can indicate a variety of deleterious effects on the crops, such as insect damage, nutrient deficiency, and moisture deficiency. The crop health change module compares the current image to previously-acquired images and checks for potential changes in crop condition based on changes in normalized NDVI. The current image and comparison image are directly contrasted. Changes in crop health are calculated, and areas of significant change are outlined. At the end of the process, a map is generated. The difference in mean-normalized NDVI between the current image and the comparison image are computed.

Figure 10:
FIG. 10 is a map illustrating an example of a cotton field showing areas with negative health change.

Crops health changes determined using remotely-sensed maps through the season are a key part of this invention, since growers will be notified about the areas of the field that experienced a positive or a negative change in health, and the associated stresses indices that impacted those areas of the field during the corresponding period (FIG. 10). This knowledge will allow the grower to decide about crop stress mitigation strategies during the season, and/or even take in account this knowledge gained about their fields and stresses development to mitigate stresses in future seasons.

More particularly, the crop health change module 124 uses the image data to subtract vegetation values in a current image from the vegetation values in a previous image to detect areas in which less growth has occurred compared to an average increase in growth throughout the image. These areas where growth is below average are identified as having a negative health change and are flagged for further consideration by the system.

The crop health change module 124 thus (i) receives remotely-sensed images of the agricultural field acquired during the growing season including at least one recent image that was recently acquired and at least one past image that was acquired previously to said at least one recent image, (ii) calculates a vegetation index for each of the remotely-sensed images of the agricultural field, and (iii) compares the vegetation index of said at least one recent image and said at least one past image to identify negative health change areas representing portions of the agricultural field experiencing slower growth compared to a remainder of the agricultural field. The system may then generate a notification or alert upon identification of negative health change areas.

The Cropping Systems Model 128 is used by the preseason crop stress module 125, the crop stress mitigation module 126 during the growing season, and the postseason mitigation module 127. The cropping systems model 128 uses data input from the field centric data feed 123, and other sources such as an optional third party weather feed, soil analysis from a laboratory, etc., identified crop characteristics, and historical information related to the field to simulate growth of the crop during a growing season and estimate the current growth stage of the crop at various points throughout the growing season.

More particularly, the Cropping Systems Model (CSM) used in this invention aims to detect, quantify and notify growers about abiotic and biotic stresses. The CSM includes process-based computer models that mimic the growth and development of a crop in a zone or field. The Cropping System Models used for the simulations of crop growth and development are based on a set of field centric inputs related to: a) genotype characteristics described by varieties specific parameters obtained from the model calibration, b) soil profile properties usually obtained from laboratory analysis of soil samples taken at growers fields in combination with public sources such as SSURGO or WISE soils databases, including variables such as clay, silt and sand content, field capacity, wilting point, soil saturation point, hydraulic conductivity, soil drainage class, runoff curve number, soil albedo, organic carbon, soil nitrogen, pH, and cation exchange capacity, c) weather variables obtained from weather stations installed at growers fields, from short-term weather forecast and from long term weather forecast, including daily maximum and minimum air temperatures, solar radiation, relative humidity, wind speed, and precipitation, d) crop management practices, including tillage type and dates, planting date, plant population, planting depth, row spacing, fertilizers' applications and irrigation details.

Figure 5:
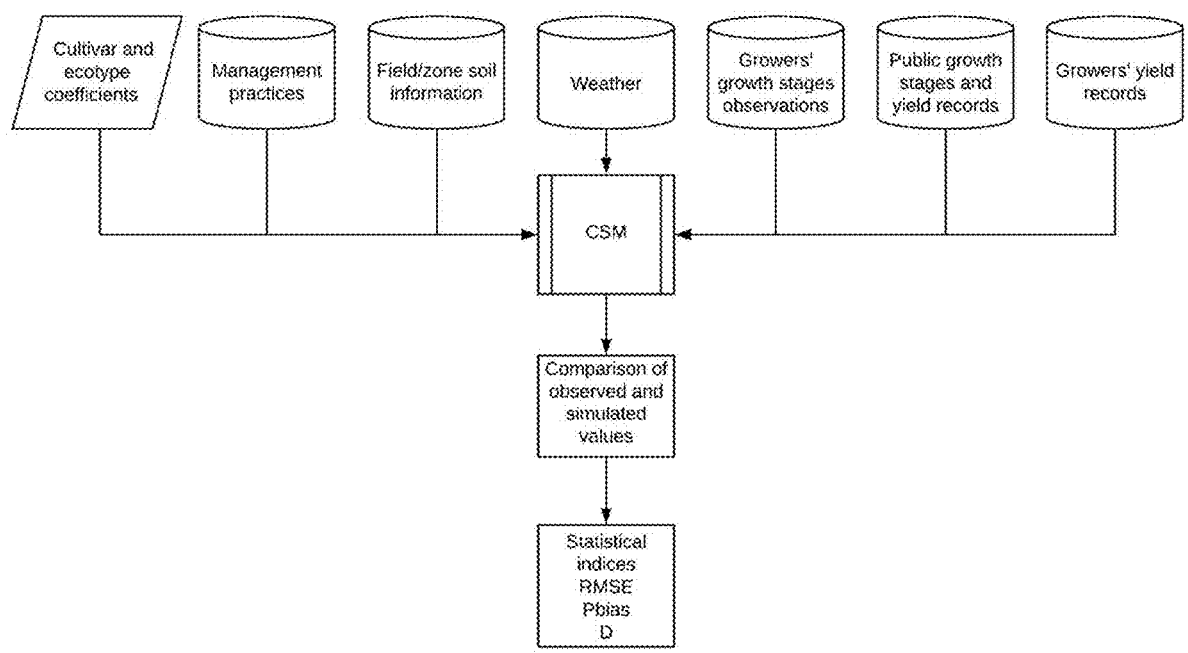
FIG. 5 illustrates a general overview of the Cropping Systems Models (CSM) calibration process.

Varieties used in the Cropping Systems Models (CSM) are calibrated using a combination of the following options: a) scouting observations collected at growers' fields, and calibrated yields obtained from CANPLUGS devices installed in the harvesters, b) public information related to growth stages and measured yields such as information published in variety trials, c) in house growth stages and yield measurements from Farmers Edge research sites and from partners' research fields. A pool of observations obtained from multiple fields, with the corresponding models' inputs, are used to calibrate each variety by comparing observed and predicted values, and selecting the combination of cultivar coefficients that result with the best statistics between the values, such as RMSE, Willmott Index of Agreement (d), and PBIAS. Visualization of the general Cropping Systems Models calibration process can be found in FIG. 5.

Figure 2:
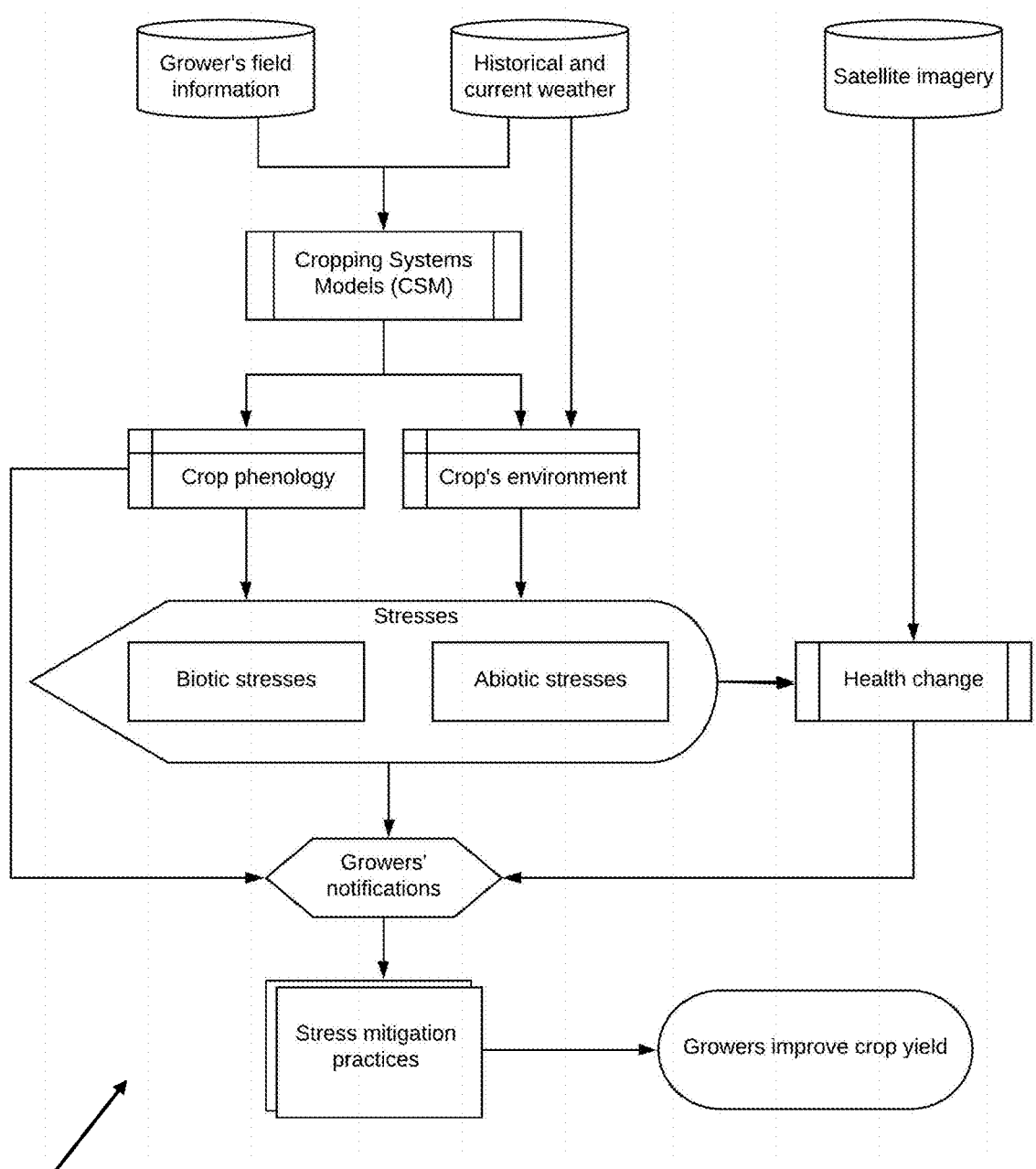
FIG. 2 illustrates an overview of the crop stress mitigation module of the advanced crop manager.
Figure 6:
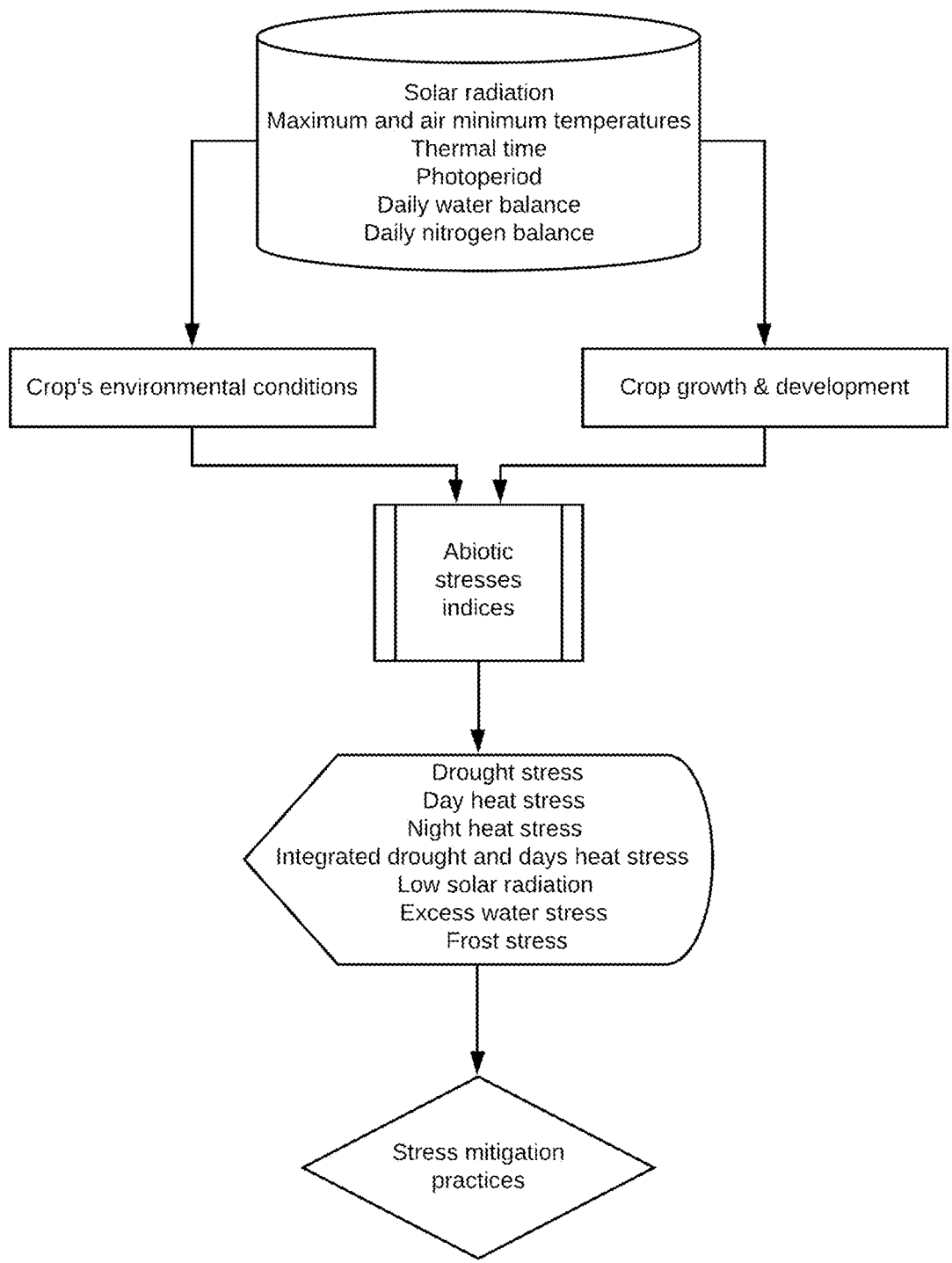
FIG. 6 illustrates an overview of the main subcomponents of the advanced crop manager.
Figure 7A:
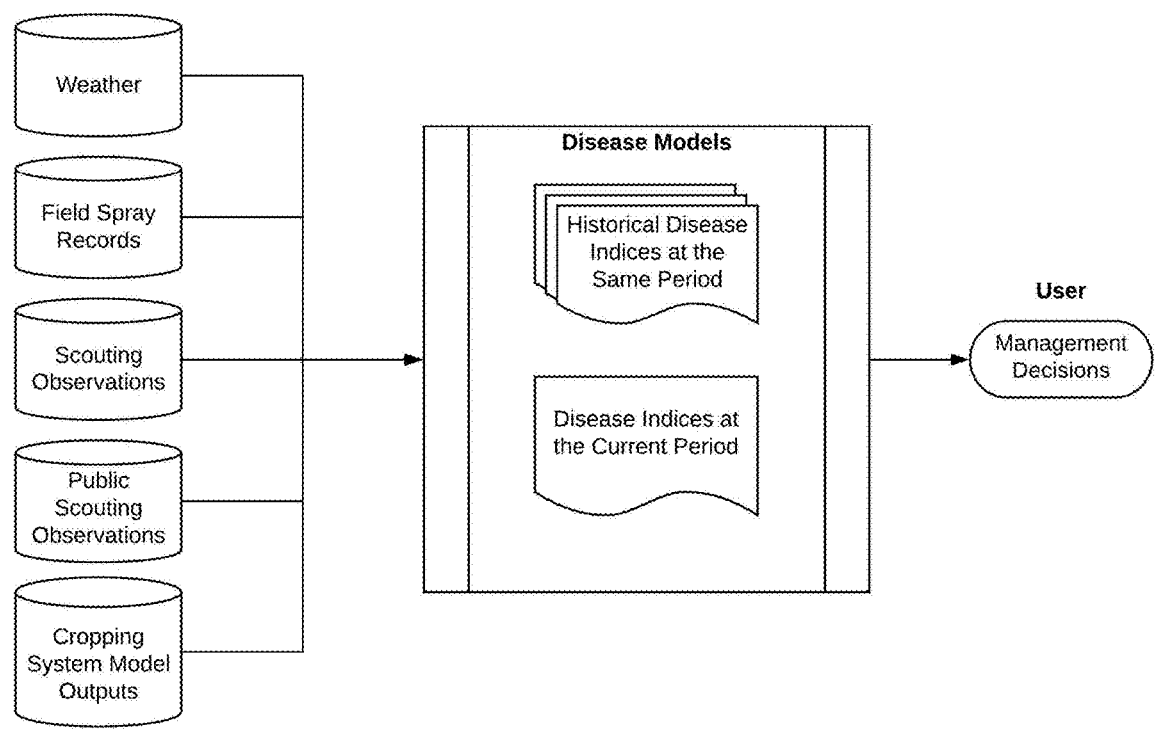
FIG. 7(a) illustrates an overview of the biotic stresses components of the advanced crop manager related to crop disease risk.
Figure 7B:
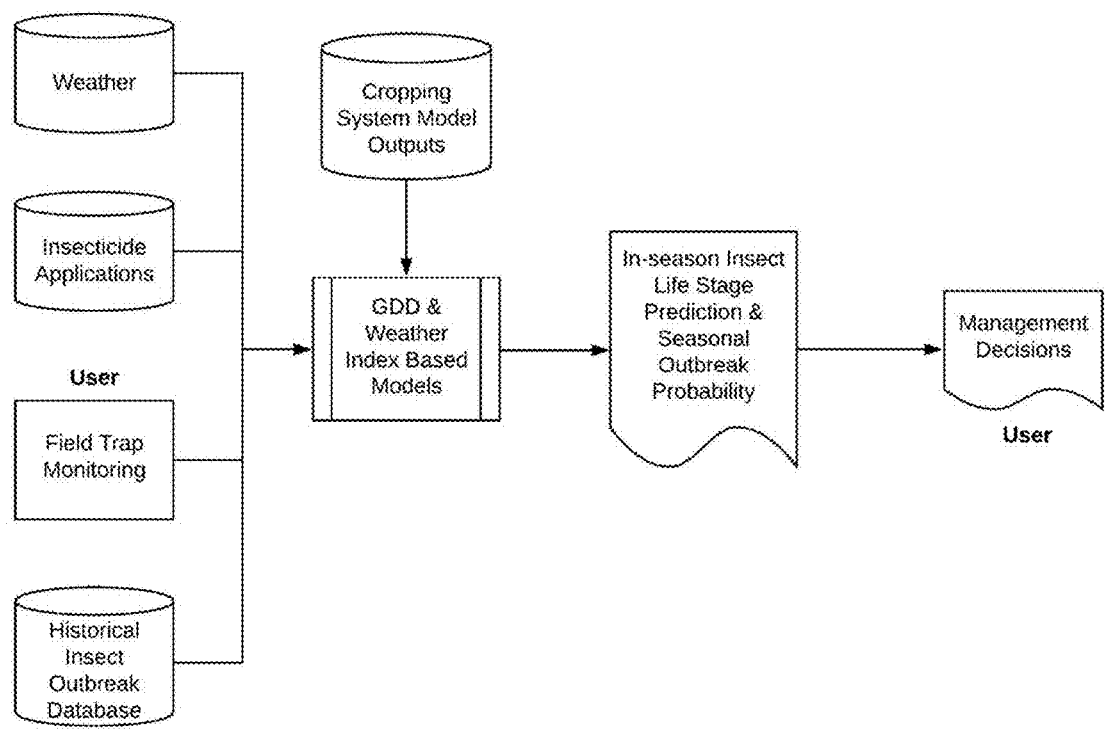
FIG. 7(b) illustrates an overview of the biotic stresses components of the advanced crop manager related to crop pest risk.

The main stress components of the advanced crop manager according to the crop stress mitigation module 126 are shown in FIG. 2. Additional subcomponents relating to abiotic stress analysis components of the crop stress mitigation module 126 are shown in FIG. 6, while additional subcomponents relating to biotic stress from crop disease risk and biotic stress from crop pest risk are shown in FIG. 7(a) and FIG. 7(b) respectively.

For each field, multiple outputs files related to the crop growth and development are combined and stored in a database. From such storage, the daily weather variables, daily soil water and soil nitrogen components are used associated to the growth stages predicted dates in the algorithms to calculate the different abiotic stresses indices.

An example of the predicted growth stages for cotton crop is shown in Table 1 below.

TABLE 1

Cotton growth stages, code, and description.

| Code | Growth stage description |
| --- | --- |
| VE | 50% plants w some part visible at soil surface |
| V1 | 50% plants with 1 developed node on the main axis |
| V2 | 50% plants with 2 developed nodes on the main axis |
| V3 | 50% plants with 3 developed nodes on the main axis |
| V4 | 50% plants with 4 developed nodes on the main axis |
| V5 | 50% plants with 5 developed nodes on the main axis |
| 1st square | 50% plants with pinhead square |
| R1 | 50% plants beginning flower |
| R3 | 50% plants boll > 6 mm or ¼ inch |
| R5 | Beginning seed |
| R7 | First cracked boll (beginning maturity) |
| R8 | 90% of the bolls open (maturity) |

The simulated root length of the crop is adjusted accordingly for each crop during early season. The updated root length is used to calculate the soil water content at root depth.

The average soil water content for each day of the season for the corresponding soil layers where the roots are most present is calculated using the modeled length adjustment for the early season period (in cotton crop is from planting to 10 days after 1st square), and the simulated root depth for the rest of the season.

Figure 8:
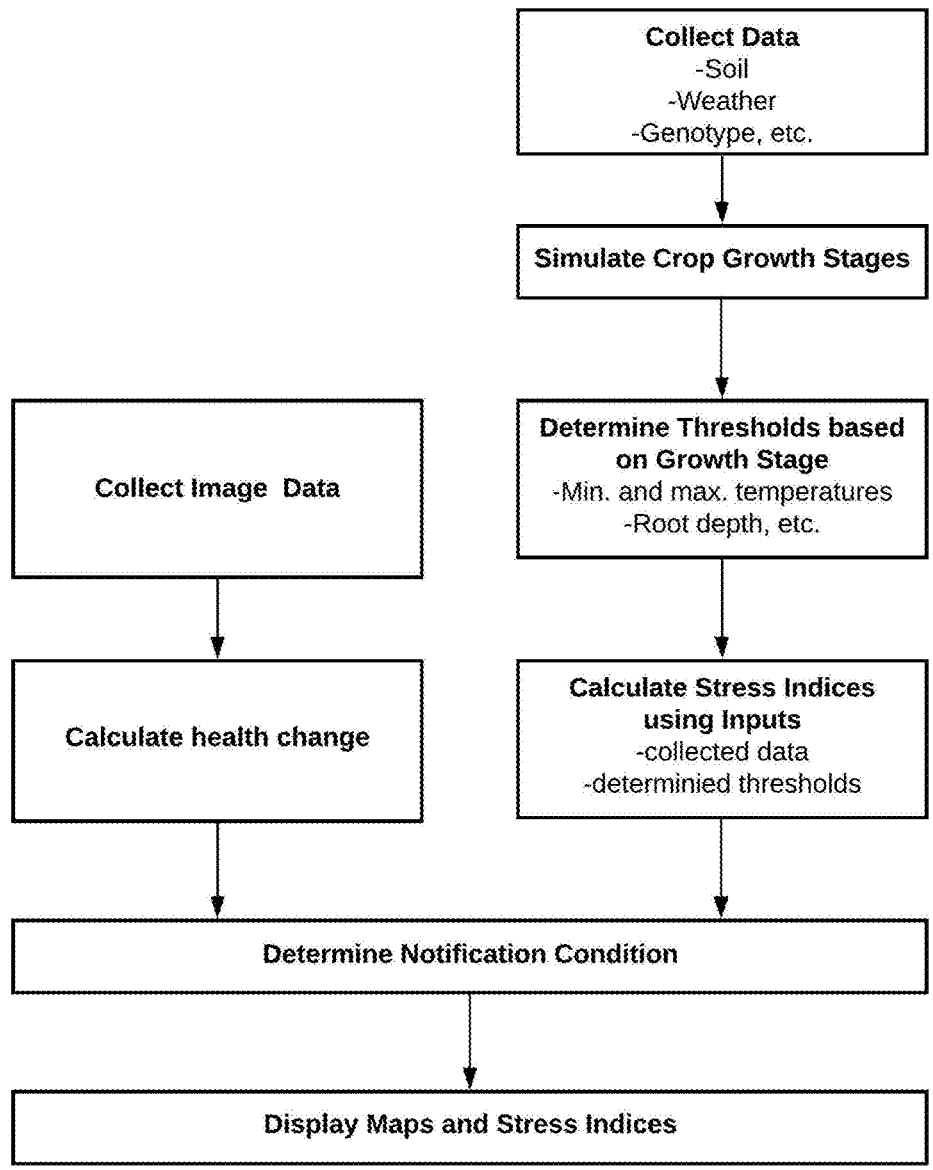
FIG. 8 illustrates the workflow for the crop stress mitigation module of the advanced crop manager according to one example embodiment.

As shown in FIG. 8, the general flow executed by the crop stress mitigation module 126 during the current growing season of a crop growing within an agricultural field initially involves acquiring various field centric data defining parameters associated with the crop growing within the agricultural field. This field centric data is fed into the cropping systems model 128 so that the cropping systems model executed on the computing system functions to stimulate the growth of the crop and estimates the timing of the various growth stages, for example according to the table shown above. The crop stress mitigation module 126 accesses the memory of the computer system that stores various thresholds thereon in association with each growth stage.

In particular, each of a plurality of different stress indices are calculated using acquired field centric data relating to current crop conditions together with associated thresholds stored on the computer memory. Each stress index includes one or more thresholds associated therewith in which each of the thresholds is in turn associated with a respective growth stage. Based on the determined growth stage from the cropping systems model, the corresponding stored thresholds that are associated with the determined growth stage and associated with the current stress index being calculated are then used in the stress index calculation. Accordingly, each stress index is calculated using measured data among the acquired field centric data, in which the measured data used to calculate each stress index define different parameters than other stress indices. Furthermore, each stress index includes a plurality of different stress thresholds associated therewith in which the different stress thresholds of the stress index are associated with different prescribed growth stages of the crop.

Each stress index calculated is representative of a crop stress affecting growth of the crop based upon the acquired field centric data and the one or more stress thresholds associated with the determined growth stage of the crop. In the current embodiment, the stress indices calculated include (i) a plurality of abiotic stress indices representative of abiotic stresses acting upon the crop growing within the agricultural field during the growing season as evaluated by the abiotic components shown in FIG. 6 of the crop stress mitigation module 126, and (ii) a plurality of biotic stress indices representative of biotic stresses acting upon the crop growing within the agricultural field during the growing season as evaluated by the biotic components shown in FIGS. 7a and 7b of the crop stress mitigation module 126.

In the final step of the flowchart of FIG. 8, the notification module 129 of the system receives any determinations of negative health change area from the crop health change module 124 as well as receiving all of the calculated indices from the crop stress mitigation module 126. Various criteria can then be used to determine a notification condition which then results in a notification being generated and delivered to the client system 130 over the network 140. In some instances, the calculated stress indices are compared to notification criteria so that a notification is delivered when the criteria is met by one or more calculated stress indices. A map illustrating the negative health change area can be included with the notification or alert to assist the user in identifying problem areas that require attention to mitigate stress. In other instances, identification of a negative health change area that meets certain criteria can be the basis for a notification or alert. Calculated stress indices are then reported together with a map illustrating the negative health change area in instances where the negative health change area met criteria as a basis for generating a notification or alert. In each instance, a map representing negative health change area and the calculated stress indices are stored for ready access and subsequent display on the client system 130 that accesses the data over the network 140. The client system 130 upon which the data can be displayed may be a personal computer or portable computing devices such as a smartphone, tablet or laptop computer as examples.

The stress indices include a drought stress index in which the drought stress index is calculated using an estimate of soil water content at a soil depth that corresponds to an estimated root depth based upon the determined growth stage from the cropping systems model. In this tool, drought may be used as a criterion for weighting a calculated drought stress index. The criteria used to define drought is defined in general as days when all the following conditions are met: a) the soil water content (SWC) at the root depth threshold is less than 80% (in which the root depth threshold is established as a stored threshold associated with a growth stage predicted by the cropping systems module), b) the SWC is lower than the previous' day, c) precipitation is less than 2.0 mm. One key characteristic is that the drought stress index is increased when the potential evapotranspiration (ETo) is greater than 2.0 mm. The final drought stress index is corrected using a weighting factor to account for consecutive days with drought as determined by the above drought criteria, with the objective to account for the negative impact of drought in yield when occurs during long periods during the season.

Other stress indices may similarly be a weighted stress index that has weighting criteria associated therewith for applying the weighting factor when the weighting criteria is met. In this instance, the method of calculating the stress index includes correcting the weighted stress index by a weighting factor if the weighting criteria is met for a prescribed number of consecutive days.

The day heat stress index is calculated specifically for the different phases of the crop, using maximum daily air temperatures in the algorithms. In the case of cotton crop, the following three phases 1—emergence to 1st square, 2—first square to first seed, and 3—first seed to physiological maturity are assigned different maximum temperature thresholds.

For each crop phase, the days with maximum temperature greater than the "Lower Threshold" are identified to calculate the "Basic day heat stress index" on these days. The day heat stress index is obtained using an equation considering the "Lower Threshold" and the "Upper Threshold", and a correction factor applied to account for the damage of the crop exposed to consecutive days with heat stress. One important aspect of this invention is that all abiotic stresses are standardized to vary between zero and one. As described above, the day heat stress index is calculated when a maximum measured daytime temperature exceeds a lower temperature threshold, in which the lower temperature threshold is dependent upon the determined growth stage of the crop.

The night heat stress index is also calculated specifically for the different phases of the crop but using minimum daily air temperatures in the algorithms. For each crop phase, the days with minimum temperature greater than the "Lower Threshold" are identified to calculate the night heat stress index on these days. The night heat stress index is obtained using an equation considering the "Lower Threshold" and the "Upper Threshold" of night temperatures, in this case the minimum daily temperatures, for each phase of the crop.

Similarly, the night heat stress index is calculated when a maximum measured night time temperature exceeds a lower temperature threshold, in which the low temperature threshold is dependent upon the determined growth stage of the crop.

When both, day heat and drought stress occur in the same day, it is likely to result in the crop being exposed to a synergistic negative impact, meaning depending on the growth stage, there could be a significant reduction in biomass production, pollen viability and pollination, and an increased loss of reproductive structures, and eventually a significant yield reduction. The integrated drought and day heat stress index was developed to account for these conditions. Thus, when both, day heat and drought stress occur in the same day, i.e. both stresses are greater than zero, an equation to calculate the integrated drought and day heat stress index is used. Since the indices vary between zero and one, it is relatively easy to integrate them.

Other stress indices may be also be calculated as an aggregate index by integrating two or more of the other stress indices represented herein, similarly to the day heat and drought stress index noted above. Calculating each stress index to be a standardized value between zero and one simplifies the process of integrating stress indices into an aggregate index.

The low solar radiation index is an algorithm to account for the potential damage to crops beyond reduction in photosynthesis per se, aiming to account for the potential loss of reproductive structures due to cloudy days that normally occur in crops such as cotton. More particularly, the low solar radiation stress index calculated from a determined number of cloudy days within a prescribed growth stage of the crop.

The excess water stress index accounts for conditions of excess of water in the soil and the corresponding damage to the crop due to hypoxia conditions in the roots zone. This algorithm is derived for each zone or field from the a) average soil water content at root depth, b) the saturated water content. More particularly, the excess water stress index is calculated using (i) an estimate of soil water content at a soil depth corresponding to an estimated root depth based upon the determined growth stage from the cropping systems model and (ii) the saturated water content.

The frost index accounts for effects of cold events during the crop growth cycle. Although the perennial and winter crops are more affected by them, early or late frost events can negatively impact annual crops grown in spring or fall. The strength of the cold event is related to the duration of the period with temperature below the lower threshold and to the minimum temperature observed. The frost index equal to one indicates a severe frost that may cause crop death, while an index value equal to zero, indicate no frost at all.

Related to biotic stresses, this tool relies upon the biotic stress subcomponents of the crop stress mitigation module 126 which quantifies the disease and insect stress using field centric weather station data and crop phenology information (FIGS. 7a and 7b). In this invention the field centric data is used as inputs in algorithms to estimate pest and diseases risks to alert the growers about the biotic risks during those critical growth stages. The tool also allows to compare the quantified biotic stress during the critical growth stage of the current environment, to a similar period in the past, allowing growers to compare the risk of a current period to the historical disease risks.

The following indices and tools are incorporated in this invention aiming to aid growers in the decision-making process related to treatments for diseases and insects.

a) Index to identify and predict in-season risk of infection events, showing the seasonal trend of the biotic stress, such as disease onset or disease growth rate, weather favourability for disease development using field collected weather and agronomic data.

b) Index to compare biotic stress during the crop critical growth stages compared to a wet and a dry year scenario.

c) Insect life stage predictions based on weather data, agronomic practices and cropping system model outputs. Applying insecticide at the right insect life stages can improve insecticide efficiency and potentially save unneeded sprays; it helps growers decide the insecticide application timings.

As described above, the calculation of either of the disease stress index or the insect stress index involves use of the cropping systems model or a similar modelling module which receives various field centric data as inputs including weather data and crop management activities performed on the agricultural fields, such as application of field spray treatments, together with the simulated growth stages of the crop output from the cropping systems model, for simulating the progression of the biotic stress such as the reproduction of insects or the progression of disease. In the instance of insects, field traps may be a further source of field centric data input into the system.

The crop stress mitigation module may be used to determine a biotic stress risk by comparing a calculated biotic stress index to a stored historical biotic stress index having a growth stage in a prior growing season corresponding to the determined growth stage of the crop growing during the current growing season.

The system may further acquire various historical data relating to historical disease indices at the same crop growth stage, or historical insect outbreaks at the same crop growth stage and match the current calculated biotic stress index to the historical indices to determine a predicted progression stage of the biotic stress. The calculated disease stress index or the insect stress index may thus be indicative of a risk or probability of the biotic stress being damaging to the crop such that a suitable notification can be determined and generated by the notification module to alert a user that a treatment should be applied to the crop in response to a progression stage of the biotic stress being predicted. The notification may thus prompt a user to apply a suitable treatment chemical to the field by spraying to mitigate disease or insect growth.

Turning now to FIG. 3, an overview of the preseason crop stress module 125 will now be described in further detail. Prior to the growing season various information relating to the agricultural fields defined as the field centric data above, together with current and historical weather information is fed into the cropping systems model to simulate the various growth stages of the crop. The simulated growth stages are merged with other crop phenology data to calculate numerous abiotic stress indices and biotic stress indices predicted throughout the growing season. Based upon the simulated stress indices, a probability associated with each stress type can be determined and stored on the system for further analysis by the user to assist in crop planning. Once the stored probabilities are displayed to the user, the user can make informed decisions with regard to what crop types and varieties are planted, in what areas, at what times, and using what crop management activities for the growing season to minimize risks associated with the crop stresses. The method executed by the preseason crop stress module 125 thus includes the steps of (i) prior to the growing season, simulating growth stages of the crop using historical data representing field centric data from past growing seasons, (ii) using crop phenology data and the simulated growth stages to calculate a probability associated with at least one stress index representative of a crop stress affecting growth of the crop, and (iii) storing the calculated probability for subsequent display to a user.

Turning now to FIG. 4 an overview of the postseason crop stress module 127 will now be described in further detail. In this instance, various data analysis occurs subsequent to the growing season. Using the acquired field centric data including environmental factors such as field location and topography, crop characteristics such as crop type and crop variety, and additional variables measured at various points throughout the growing season such as temperature and solar radiation, the Cropping Systems Model can be used to simulate a potential yield if all biotic and abiotic stresses are mitigated. Accordingly, the calculated potential yield is representative of crop yield in the absence of crop stresses.

The module 127 then analyses all current seasonal weather including precipitation, relative humidity and wind speed for example, together with recorded field management practices relating to nutrient levels to obtain a measure of abiotic stresses. By applying the measured abiotic stresses to the calculated potential yields, an attainable yield is calculated. The attainable yield is representative of crop yield resulting from abiotic crop stresses and in the absence of biotic crop stresses.

The calculated potential yield and the calculated attainable yield are stored by the system and can be used to calculate the climate efficiency by comparing the attainable yield to the potential yield so that the climate efficiency represents a ratio of attainable yield to potential yield. The stored yield values and the calculated efficiency can be displayed to the user on the client system 130 at any time to assist the user in management decisions with regard to future crops.

The module 127 is also capable of analysing various data relating to field management practices. The actual yield is the measured crop yield from the current growing season. The management efficiency can be calculated by comparing the attainable yield to the actual yield so that the management efficiency represents a ratio of attainable yield to actual yield. The yield values and the management efficiency can be stored for subsequent display to the user on the client system 130 at any time to assist the user in management decisions with regard to future crops.

The module 127 may also be used to calculate a yield gap indicative of crop yields lost to abiotic and biotic crop stresses combined by subtracting actual yield from the potential yield, and storing the calculated yield gap for subsequent display to a user on the client system 130.

Figure 9:
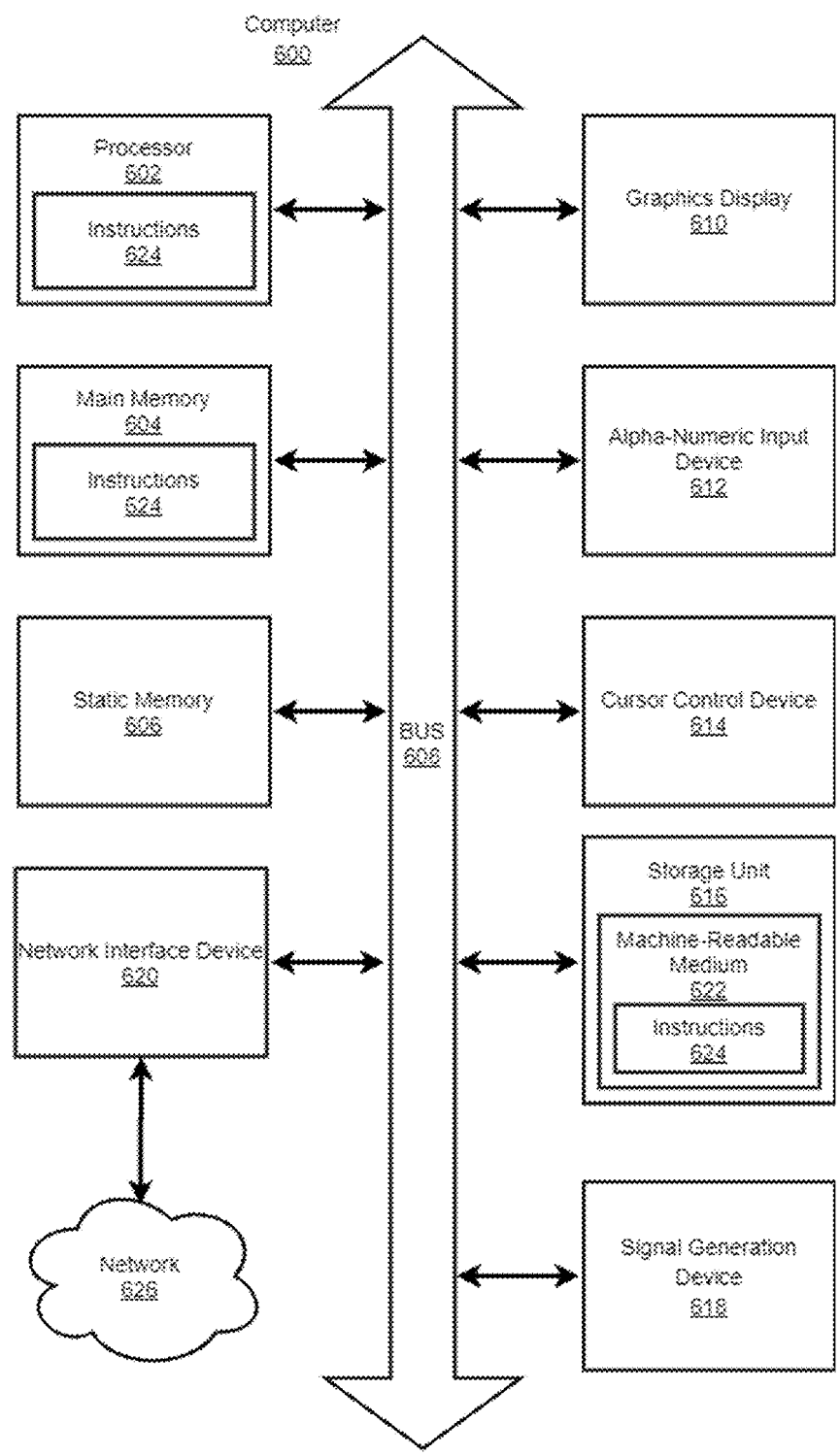
FIG. 9 illustrates the system environment for managing crop stresses, according to one example embodiment.

FIG. 9 is a block diagram illustrating components of an example machine or computer system for reading and executing instructions from a machine-readable medium. Specifically, FIG. 9 shows a diagrammatic representation of network system 120 and client device 130 in the example form of a computer system 600. Thus, the computer system implements the methods described herein. The computer system 600 can be used to execute instructions 624 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client system environment 100, or as a peer machine in a peer-to-peer (or distributed) system environment 100.

The machine may be a server computer, a client computer, a personal computer (PC), a tablet PC, a set-top box (STB), a smartphone, an internet of things (IoT) appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processing units (generally processor 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 600 also includes a main memory 604. The computer system may include a storage unit 616. The processor 602, memory 604, and the storage unit 616 communicate via a bus 608.

In addition, the computer system 600 can include a static memory 606, a graphics display 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. For example, the instructions 624 may include the functionalities of modules of the client device 130 or network system 120 described in FIG. 1. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626 (e.g., network 120) via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A method of managing crop stress related to a crop growing within an agricultural field during a growing season using a computing device, the method comprising:
providing a plurality of different stress thresholds stored on the computing device in association with different prescribed growth stages of the crop;
acquiring field centric data defining parameters associated with the crop growing within the agricultural field during the growing season;
determining the growth stage of the crop using the acquired field centric data input into a cropping systems model executed on the computing device to simulate growth of the crop;
using the computing device, selecting one or more of the stress thresholds among the plurality of different stress thresholds associated with the growth stage of the crop as determined by the cropping systems model executed on the computing device;
using the computing device, calculating at least one stress index representative of a crop stress affecting growth of the crop based upon (i) the acquired field centric data and (ii) said selected one or more of the stress thresholds;
using the computing device, determining a notification condition based upon the calculated at least one stress index being representative of said crop stress affecting the growth of the crop within the agricultural field and generating a notification in response to determination of the notification condition, the notification including a map of the agricultural field indicating health change areas and the at least one stress index impacting the health change areas; and
adjusting field management practices to mitigate the at least one stress index acting on the health change areas.

2. The method according to claim 1 wherein said at least one stress index comprises a plurality of stress indices, each stress index being calculated using measured data among the acquired field centric data, in which the measured data used to calculate each stress index define different parameters than other stress indices.

3. The method according to claim 1 wherein said at least one stress index includes (i) at least one abiotic stress index representative of an abiotic stress acting upon the crop growing within the agricultural field during the growing season and (ii) at least one biotic stress index representative of a biotic stress acting upon the crop growing within the agricultural field during the growing season.

4. The method according to claim 1 wherein said at least one stress index comprises a plurality of stress indices, the method further comprising calculating at least one aggregate index by integrating two or more of the stress indices.

5. The method according to claim 1 wherein each stress index is standardized to a value between zero and one.

6. The method according to claim 1 wherein said at least one stress index includes a weighted stress index having weighting criteria associated therewith, the method including correcting the weighted stress index by a weighting factor if the weighting criteria is met for a prescribed number of consecutive days.

7. The method according to claim 1 further comprising determining the notification condition by comparing the at least one stress index calculated to respective notification criteria.

8. The method according to claim 1 further comprising:
receiving remotely-sensed images of the agricultural field acquired during the growing season including at least one recent image that was recently acquired and at least one past image that was acquired previously to said at least one recent image;
calculating a vegetation index for each of the remotely sensed images of the agricultural field;
comparing the vegetation index of said at least one recent image and said at least one past image to identify negative health change areas representing portions of the agricultural field experiencing slower growth compared to a remainder of the agricultural field; and
generating said notification upon identification of negative health change areas.

9. The method according to claim 8 wherein said notification includes identification of the negative health change areas and identification of any calculated stress indices associated with the negative health change areas.

10. The method according to claim 1 wherein the field centric data input into the cropping systems model comprises: (a) genotype characteristics; (b) soil profile properties obtained from soil samples; (c) weather data; and/or (d) crop management activities performed on the agricultural field.

11. The method according to claim 1 wherein each stress index includes a plurality of different stress thresholds associated therewith in which the different stress thresholds of the stress index are associated with different prescribed growth stages of the crop.

12. The method according to claim 1 further comprising:
prior to the growing season, simulating growth stages of the crop using historical data representing field centric data from past growing seasons;
using crop phenology data and the simulated growth stages to calculate a probability associated with at least one stress index representative of a crop stress affecting growth of the crop; and
storing the calculated probability for subsequent display to a user.

13. The method according to claim 1 further comprising:
subsequent to the growing season, simulating growth stages of the crop using the field centric data acquired throughout the growing season to calculate a potential yield representative of crop yield in the absence of crop stresses;
calculating a plurality of abiotic stress indices based on the field centric data acquired throughout the growing season;
applying the calculated abiotic stress indices to the potential yield to determine an attainable yield representative of crop yield resulting from abiotic crop stresses and in the absence of biotic crop stresses; and
storing the calculated attainable yield for subsequent display to a user.

14. The method according to claim 13 further comprising calculating a climate efficiency by comparing the attainable yield to the potential yield; and
storing the calculated climate efficiency for subsequent display to a user.

15. The method according to claim 13 further comprising determining an actual yield subsequent to the growing season, calculating a management efficiency by comparing the attainable yield to the actual yield, and storing the calculated management efficiency for subsequent display to a user.

16. The method according to claim 13 further comprising calculating a yield gap indicative of crop yields lost to abiotic and biotic crop stresses combined by subtracting actual yield from the potential yield, and storing the calculated yield gap for subsequent display to a user.

17. The method according to claim 1 wherein said at least one stress index includes at least one biotic stress index representative of a biotic stress acting upon the crop growing within the agricultural field during the growing season, the method including determining a biotic stress risk by comparing the calculated biotic stress index to a stored historical biotic stress index having a growth stage in a prior growing season corresponding to the determined growth stage of the crop growing during the current growing season.

18. The method according to claim 1 wherein said notification comprises a direction to apply a stress treatment to the crop.

19. The method according to claim 1 wherein the at least one stress index includes a drought stress index, the drought stress index being calculated using an estimate of soil water content at a soil depth corresponding to an estimated root depth based upon the determined growth stage from the cropping systems model.

20. The method according to claim 1 wherein the at least one stress index includes a day heat stress index, the day heat stress index being calculated when a maximum measured daytime temperature exceeds a lower temperature threshold, the lower temperature threshold being dependent upon the determined growth stage of the crop.

21. The method according to claim 1 wherein the at least one stress index includes a night heat stress index, the night heat stress index being calculated when a minimum measured nighttime temperature exceeds a lower temperature threshold, the lower temperature threshold being dependent upon the determined growth stage of the crop.

22. The method according to claim 1 wherein the at least one stress index includes an aggregate day heat and drought stress index calculated by integrating a day heat stress index and a drought stress index, the day heat stress index being calculated when a maximum measured daytime temperature exceeds a low temperature threshold, the low temperature threshold being dependent upon the determined growth stage of the crop, and the drought stress index being calculated using an estimate of soil water content at a soil depth corresponding to an estimated root depth based upon the determined growth stage from the cropping systems model.

23. The method according to claim 1 wherein the at least one stress index includes a low solar radiation stress index calculated from a determined number of cloudy days within a prescribed growth stage of the crop.

24. The method according to claim 1 wherein the at least one stress index includes an excess water stress index, the excess water stress index being calculated using (i) an estimate of soil water content at a soil depth corresponding to an estimated root depth based upon the determined growth stage from the cropping systems model and (ii) saturated water content.

25. The method according to claim 1 wherein the at least one stress index includes a frost index, the frost index being calculated based upon (i) a duration of a prescribed frost period in which observed temperature is below a lower temperature threshold and (ii) a minimum temperature observed.

* * * * *